(12) United States Patent
Ishimaru et al.

(10) Patent No.: US 10,533,624 B2
(45) Date of Patent: Jan. 14, 2020

(54) CYLINDER DEVICE

(71) Applicant: HITACHI AUTOMOTIVE SYSTEMS, LTD., Ibaraki (JP)

(72) Inventors: Yu Ishimaru, Fujisawa (JP); Naoki Ishibashi, Ebina (JP); Takayuki Ohno, Chigasaki (JP); Makoto Tajima, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/740,234

(22) PCT Filed: Jun. 13, 2016

(86) PCT No.: PCT/JP2016/067530
§ 371 (c)(1),
(2) Date: Dec. 27, 2017

(87) PCT Pub. No.: WO2017/002595
PCT Pub. Date: Jan. 5, 2017

(65) Prior Publication Data
US 2018/0195574 A1    Jul. 12, 2018

(30) Foreign Application Priority Data
Jun. 30, 2015    (JP) ................... 131327/2015

(51) Int. Cl.
*F16F 9/58*    (2006.01)
*F16F 9/49*    (2006.01)
(Continued)

(52) U.S. Cl.
CPC .............. *F16F 9/58* (2013.01); *F16F 9/49* (2013.01); *F16F 9/5126* (2013.01); *F16F 9/3214* (2013.01); *F16F 9/483* (2013.01)

(58) Field of Classification Search
CPC ...... F16F 9/49; F16F 9/58; F16F 9/585; F16F 9/3214; F16F 9/5126; F16F 9/483
(Continued)

(56) References Cited

U.S. PATENT DOCUMENTS 3,598,205 A * 8/1971 Kenyon .................... F16F 9/49
                                                      188/174
4,230,309 A * 10/1980 Schnitzius ............ F16F 9/0209
                                                      16/66
(Continued)

FOREIGN PATENT DOCUMENTS

JP    62196432 A * 8/1987 ................ F16F 9/49
JP    2002-005215    1/2002
(Continued)

OTHER PUBLICATIONS

International Search Report dated Aug. 2, 2016 in International Application No. PCT/JP2016/067530.

*Primary Examiner* — Thomas J Williams
(74) *Attorney, Agent, or Firm* — Wenderoth, Lind & Ponack, L.L.P.

(57) ABSTRACT

A stopper mechanism includes a second cylinder provided at an end portion in an inner cylinder, and a second piston configured to move along with movement of a piston rod to be capable of being fit-inserted through the second cylinder. The second piston includes a stopper coupled to the piston rod, a castle integrated with the stopper by plastic flow to form a ring groove on an outer periphery of the second piston between the castle and the stopper, and a piston ring fixed into a ring groove formed by the stopper and the castle so that the piston ring is displaceable in the ring groove in an axial direction and is retained in the ring groove, and has an annular shape with both ends in a circumferential direction which are formed by partially cutting the piston ring.

6 Claims, 9 Drawing Sheets

(51) Int. Cl.
  *F16F 9/516*   (2006.01)
  *F16F 9/512*   (2006.01)
  *F16F 9/32*   (2006.01)
  *F16F 9/48*   (2006.01)

(58) Field of Classification Search
  USPC .................................... 188/284, 288, 297
  See application file for complete search history.

(56) References Cited

U.S. PATENT DOCUMENTS

| | | | | |
|---|---|---|---|---|
| 4,328,960 | A * | 5/1982 | Handke | F16F 9/49 188/284 |
| 4,901,828 | A * | 2/1990 | Schmidt | F16F 9/48 16/51 |
| 5,702,091 | A * | 12/1997 | Perrin | F16F 9/0245 188/280 |
| 9,651,110 | B2 * | 5/2017 | Takeno | F16F 9/585 |
| 9,835,220 | B2 * | 12/2017 | Kontny | F16F 9/49 |
| 2002/0104723 | A1 * | 8/2002 | Obst | F16F 9/49 188/288 |
| 2012/0090931 | A1 * | 4/2012 | Krazewski | B60G 13/08 188/288 |
| 2014/0144737 | A1 | 5/2014 | Endo et al. | |
| 2014/0360353 | A1 * | 12/2014 | Baalmann | F16F 9/49 92/143 |
| 2015/0090548 | A1 * | 4/2015 | Yamanaka | F16F 9/3221 188/297 |
| 2016/0091046 | A1 * | 3/2016 | Soromenho | F16F 9/49 188/297 |

FOREIGN PATENT DOCUMENTS

| | | |
|---|---|---|
| JP | 2004-225890 | 8/2004 |
| JP | 2008-215487 | 9/2008 |
| JP | 2014-129869 | 7/2014 |
| JP | 2015-068428 | 4/2015 |
| WO | 2005/106282 | 11/2005 |
| WO | WO-2013092084 A1 * | 6/2013 |
| WO | WO-2014165951 A1 * | 10/2014 |

* cited by examiner

CYLINDER DEVICE

TECHNICAL FIELD

The present invention relates to a cylinder device, which is to be mounted to vehicles such as a four-wheeled automobile and is suitably used for damping vibration of the vehicle.

BACKGROUND ART

In general, in vehicles such as a four-wheeled vehicle, a hydraulic shock absorber is provided as a cylinder device between each wheel (axle side) and a vehicle body so as to damp vibration of the vehicle (see, for example, Patent Literature 1). A related-art cylinder device of this type includes a hydraulic stopper mechanism configured to cause a hydraulic cushioning effect at maximum extension of a piston rod so as to prevent full extension.

CITATION LIST

Patent Literature

PTL 1: WO 2005/106282 A1

SUMMARY OF INVENTION

Incidentally, in the related-art cylinder device, a piston ring constructing the stopper mechanism is assembled into a ring groove formed in the stopper mechanism so that the piston ring is prevented from dropping off. In this case, at the time of assembling the piston ring into the ring groove, it is necessary to radially expand the piston ring. Thus, there is a risk in that the piston ring may be broken. Further, there is a problem in that a manner of assembling the piston ring is complicated.

The present invention has been made in view of the above-mentioned problems with the related art, and it is an object of the present invention to provide a cylinder device, which enables enhancement of work efficiency at the time of assembling components of a stopper mechanism to a piston rod.

(1) In order to achieve the above-mentioned object, according to the present invention, there is provided a cylinder device including: a first cylinder in which working fluid is sealed; a first piston, which is fit-inserted in the first cylinder so as to be slidable, and divides an inside of the first cylinder; a piston rod coupled to the first piston; a rod guide provided on one end side of the first cylinder and configured to guide the piston rod in a slidable manner by allowing the piston rod to be inserted through the rod guide; and a stopper mechanism configured to operate when the piston rod extends or retracts to reach an end portion in the first cylinder. The stopper mechanism includes: a second cylinder provided at an end portion in the first cylinder, and a second piston configured to move along with movement of the piston rod to be fit-inserted through the second cylinder. The second piston includes: a first member coupled to the piston rod; a second member integrated with the first member to form a ring groove on an outer periphery of the second piston between the first member and the second member; and a piston ring attached into the ring groove formed by the first member and the second member so that the piston ring is displaceable in an axial direction and is retained in the ring groove, and having an annular shape with both ends in a circumferential direction which are formed by partially cutting the piston ring. A subassembly including the first member, the second member, and the piston ring is fixed to the piston rod.

According to this configuration, the work efficiency at the time of assembling components of the stopper mechanism to the piston rod can be enhanced.

DESCRIPTION OF EMBODIMENTS

Now, with reference to the accompanying drawings, detailed description is made of a cylinder device according to an embodiment of the present invention by way of an example in which the cylinder device is applied to a hydraulic shock absorber.

Figure 1:
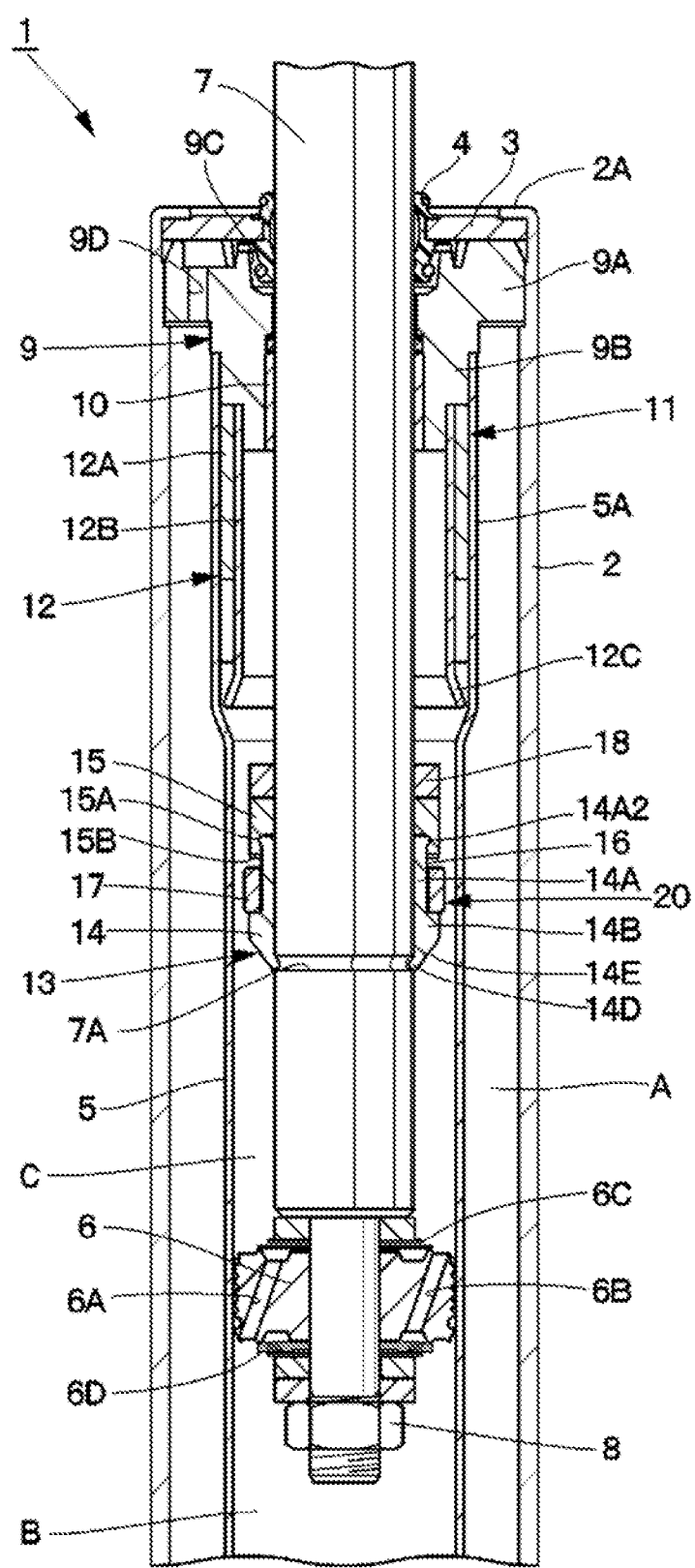
FIG. 1 is a vertical sectional view of a hydraulic shock absorber as a cylinder device according to an embodiment of the present invention.

In FIG. 1, a hydraulic shock absorber 1 is illustrated as a typical example of a cylinder device. The hydraulic shock absorber 1 is constructed as a shock absorber of a double-tube type including an outer cylinder 2 as an outer shell thereof, an inner cylinder 5, a first piston 6, a piston rod 7, a rod guide 9, and a stopper mechanism 11, which are described below.

One end (lower end in FIG. 1) side of the outer cylinder 2 of the hydraulic shock absorber 1 is a closed end closed by a bottom cap (not shown), and an upper end side as the other end side thereof is an open end. On the open end (upper end) side of the outer cylinder 2, there is provided a swaged portion 2A formed by bending the upper end to a radially inner side, and the swaged portion 2A retains a lid member 3 for closing the open end side of the outer cylinder 2 in a state in which the lid member 3 is prevented from dropping off.

In order to close the open end (upper end) side of the outer cylinder 2, an outer peripheral side of the lid member 3 formed of an annular disc is fixed by the swaged portion 2A of the outer cylinder 2 under a state of being held in abutment against the rod guide 9 described below. On an inner peripheral side of the lid member 3, a rod seal 4 made of an elastic material is mounted, and the rod seal 4 seals a gap between the piston rod 7 described below and the lid member 3.

The inner cylinder 5 as a first cylinder is provided coaxially with the outer cylinder 2. One end (lower end) side of the inner cylinder 5 is fitted and fixed to the bottom cap side through intermediation of a bottom valve (not shown). On the other end (upper end) side of the inner cylinder 5, a cylindrical large diameter portion 5A is formed by being expanded radially outward. The rod guide 9 described below is fitted and mounted to an inner periphery on the upper end side of the large diameter portion 5A. Working oil (oil liquid) as working fluid is sealed in the inner cylinder 5. The working fluid is not limited to the working oil and other oils, and water mixed with additives may be used, for example.

An annular reservoir chamber A is formed between the inner cylinder 5 and the outer cylinder 2. In this reservoir chamber A, gas is sealed together with the working oil. The gas may be air at atmospheric pressure or gas such as a compressed nitrogen gas. The gas in the reservoir chamber A is compressed to compensate a volume corresponding to an amount of entry of the piston rod 7 at the time of retraction (retraction stroke) of the piston rod 7.

The first piston 6 is slidably fit-inserted in the inner cylinder 5. The first piston 6 divides an inside of the inner cylinder 5 (first cylinder) into two chambers, that is, a bottom side oil chamber B and a rod side oil chamber C. Further, through the first piston 6, there are formed oil paths 6A and 6B capable of communicating the bottom side oil chamber B and the rod side oil chamber C to each other. Further, on an upper end surface of the first piston 6, there is arranged a retraction side disc valve 6C for applying a resistance force to the working oil which flows in the oil path 6A so as to generate a predetermined damping force in conjunction with downward sliding displacement of the first piston 6 along with the retraction of the piston rod 7. Meanwhile, on a lower end surface of the first piston 6, there is arranged an extension side disc valve 6D for applying a resistance force to the working oil which flows in the oil path 6B so as to generate a predetermined damping force in conjunction with upward sliding displacement of the first piston 6 along with extension of the piston rod 7.

One end (lower end) side of the piston rod 7 is coupled to the first piston 6. Specifically, the lower end side of the piston rod 7 is inserted into the inner cylinder 5, and is fixed to an inner peripheral side of the first piston 6 with a nut 8 and the like. Further, an upper end side of the piston rod 7 projects so as to be extendable to an outside of the outer cylinder 2 and the inner cylinder 5 through the rod guide 9, the lid member 3, and other components. The piston rod 7 includes an annular groove 7A as a groove formed at a position spaced apart by a predetermined dimension with respect to a mounting position of the first piston 6. The annular groove 7A is formed by means such as rolling processing, and a stopper 14 described below is fitted and fixed into the annular groove 7A.

The rod guide 9 is formed into a stepped cylindrical shape, and not only fitted in the upper end side of the outer cylinder 2 but also fixed to the upper end side of the large diameter portion 5A of the inner cylinder 5. With this, the rod guide 9 causes an upper part of the inner cylinder 5 to be positioned at a center of the outer cylinder 2, and slidably guides the piston rod 7, which is inserted in an inner peripheral side of the rod guide 9, in an axial direction. Further, the rod guide 9 serves as a support structure for supporting the lid member 3 from an inside thereof at the time of fixation of the lid member 3 from the outside with the swaged portion 2A of the outer cylinder 2.

The rod guide 9 is formed into a predetermined shape by subjecting a metal material, a hard resin material, and the like to a molding process, a trimming process, and the like. Specifically, as illustrated in FIG. 1, the rod guide 9 is formed into the stepped cylindrical shape including a large diameter portion 9A positioned on an upper side and fit-inserted in an inner peripheral side of the outer cylinder 2, and the small diameter portion 9B positioned on a lower side with respect to the large diameter portion 9A and fit-inserted in an inner peripheral side of the inner cylinder 5. On an inner peripheral side of the small diameter portion 9B, there is provided a guide portion 10 for slidably guiding the piston rod 7, which is inserted in the inner cylinder 5, in the axial direction. The guide portion 10 is formed of a slidable cylindrical body obtained by covering, for example, an inner peripheral surface of a metal cylindrical body with a fluororesin (polytetrafluoroethylene).

Further, in the large diameter portion 9A of the rod guide 9, an annular oil pool chamber 9C is provided on an upper surface side of the large diameter portion 9A, which is opposed to the lid member 3. The oil pool chamber 9C is formed as an annular space portion surrounding the rod seal 4 and the piston rod 7 from a radially outer side. In addition, when the working oil or gas that is mixed in this working oil in the rod side oil chamber C leaks out, for example, through small gaps between the piston rod 7 and the guide portion 10, the oil pool chamber 9C provides a space for temporarily pooling, for example, the leaked working oil.

Further, through the large diameter portion 9A of the rod guide 9, there is provided a communication path 9D communicating constantly to the reservoir chamber A on the outer cylinder 2 side. The communication path 9D guides the working oil (containing gas) pooled in the oil pool chamber 9C to the reservoir chamber A on the outer cylinder 2 side. A check valve (not shown) is provided between the lid member 3 and the rod guide 9. Specifically, the check valve provided between the lid member 3 and the rod guide 9 allows the leakage working oil to flow to the communication path 9D (reservoir chamber A) side of the rod guide 9 and prevents reverse flow of the leakage working oil in a case in which the leakage oil increases in amount and overflows from the oil pool chamber 9C.

Next, detailed description is made of the hydraulic stopper mechanism 11, which is employed in this embodiment. When the piston rod 7 extends (extends or retracts) outward from the outer cylinder 2 and the inner cylinder 5 to reach an end portion of the inner cylinder 5 (full extension position), the stopper mechanism 11 operates as described below so as to cause a hydraulic cushioning effect for stopping extension movement of the piston rod 7. In this way, so-called full extension is prevented.

The stopper mechanism 11 includes a second cylinder 12 and a second piston 13. The second cylinder 12 is provided so as to be fixed to an inside of the large diameter portion 5A, which is positioned in the inner cylinder 5 on the projecting end side of the piston rod 7. Further, the second piston 13 is provided on an outer peripheral side of the piston rod 7 while being positioned on the rod guide 9 side with respect to the first piston 6. At maximum extension (at full extension) of the piston rod 7, the second piston 13 is slidably fit-inserted (enters) in an inner peripheral side of the second cylinder portion 12.

The second cylinder 12 includes a sleeve 12B provided in the large diameter portion 5A of the inner cylinder 5 through intermediation of a cylindrical collar 12A so as to be retained. An upper end side of the sleeve 12B is fitted and fixed to a lower end side of the small diameter portion 9B of the rod guide 9. On a lower end side of the sleeve 12B, an open end 12C is formed to be expanded into a tapered shape.

The open end 12C facilitates and compensates the slidable fit-insertion of the second piston 13, which moves integrally with the piston rod 7, into the sleeve 12B.

The second piston 13 is provided between the first piston 6 and the second cylinder 12, and serves as a movable unit of the stopper mechanism 11. Specifically, along with movement of the piston rod 7, the second piston 13 moves (is displaced) integrally therewith in the inner cylinder 5 to be fit-inserted through the second cylinder 12. The second piston 13 includes the stopper 14 coupled to the piston rod 7, a castle 15 positioned on the upper side with respect to the stopper 14, a piston ring 17 positioned between the stopper 14 and the castle 15, and a cushioning member 18 positioned on the upper side with respect to the castle 15.

Figure 2:
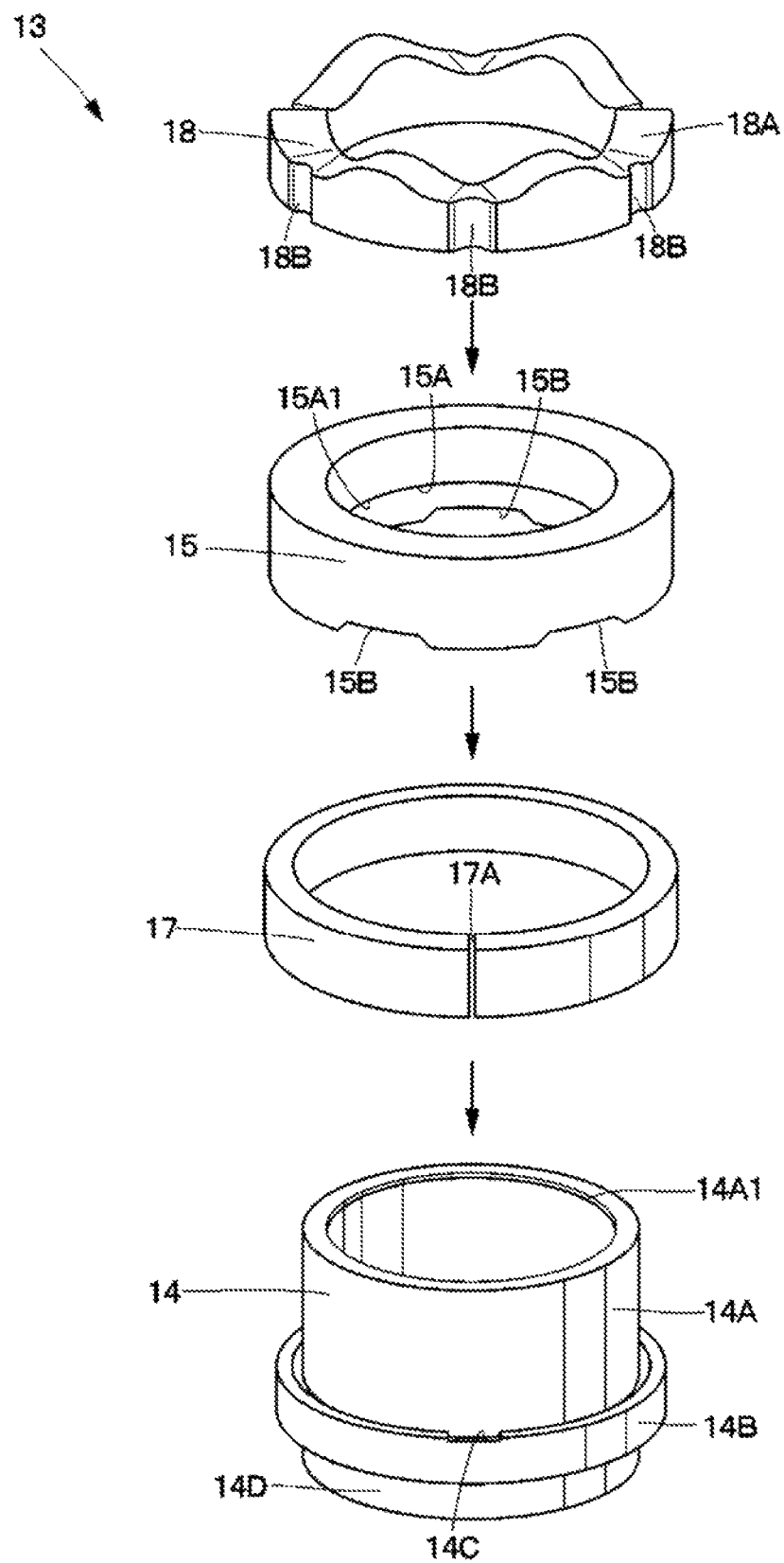
FIG. 2 is an enlarged exploded perspective view of a second piston in FIG. 1.

The stopper 14 as a first member is positioned on a lower side with respect to the second piston 13, and is fitted into the annular groove 7A on the outer peripheral side of the piston rod 7 so as to be retained. The stopper 14 includes a cylindrical portion 14A, a flange portion 14B, a cutout 14C, and a fitting portion 14D. Specifically, as illustrated in FIG. 2, the stopper 14 is made of a metal material, and is formed into a stepped cylindrical shape including a cylindrical portion 14A positioned on the upper side, and the flange portion 14B as a large diameter portion positioned on the lower side with respect to the cylindrical portion 14A. The stopper 14 causes the castle 15 and the piston ring 17 to be fixed to the piston rod 7 so as to be retained, and serves as a hydraulic stopper to suppress a flow of the working oil to generate a damping force.

An engaging-portion forming surface 14A positioned on an upper end side of the cylindrical portion 14A (castle 15 side) is fitted in the annular groove 15A1 of the stopper fixing hole 15A of the castle 15 so as to be retained by metal flow (plastic flow). Specifically, when the engaging-portion forming surface 14A1 is fitted in the annular groove 15A by metal flow, an engaging portion 14A2 having an outer diameter dimension slightly larger than that of the cylindrical portion 14A is formed (see FIG. 3 and FIG. 4). With the engaging portion 14A2 as a plastically deformed portion, the stopper 14 and the castle 15 are integrally coupled to each other (integrated with each other), thereby being capable of fixing the piston ring 17 between the stopper 14 and the castle 15 so as to be retained.

The flange portion 14B projects radially outward from a lower end side of the cylindrical portion 14A (first piston 6 side), and is formed to have an outer diameter dimension larger than that of the cylindrical portion 14A. An upper end surface of the flange portion 14B is held in abutment against a lower end surface of the piston ring 17, thereby restricting the piston ring 17 from dropping toward the first piston 6 side. In the upper end surface of the flange portion 14B, the cutout 14C is formed by partially and slightly cutting out the upper end surface of the flange portion 14B (see FIG. 2). The cutout 14C serves as a restriction path for restricting the flow of the working oil, and suppresses the flow of the working oil at the extension of the piston rod 7 to generate a damping force as described below.

The fitting portion 14D is positioned on an inner peripheral side of a lower end of the flange portion 14B of the stopper 14, and is shrunk radially inward by metal flow described below. Consequently, the fitting portion 14D is fitted in the annular groove 7A of the piston rod 7. In this manner, the stopper 14 as a whole is fixed to the piston rod 7 so as to be retained and stopped in rotation. The fitting portion 14D has an inner diameter smaller than an inner diameter of the stopper 14 by a predetermined dimension, and is formed integrally with the flange portion 14B of the stopper 14. The fitting portion 14D has a function of fixing the stopper 14 to the piston rod 7 by being fitted and coupled to the annular groove 7A so as to be retained by metal flow.

Further, on an outer peripheral surface of a lower side of the flange portion 14B, there is formed a tapered surface 14E which is a surface inclined obliquely downward, which is radially shrunk gradually downward, when the fitting portion 14D is formed by being shrunk radially inward by metal flow. The tapered surface 14E serves as a guide surface for the working oil that flows on the outer peripheral side of the stopper 14, and facilitates the flow of the working oil.

The castle 15 as a second member is positioned on the upper side with respect to the stopper 14, and is provided by being inserted on the outer peripheral side of the piston rod 7. The castle 15 is made of a metal material and formed as a cylindrical body. The castle 15 includes a stopper fixing hole 15A and a plurality of recessed portions 15B. The castle 15 constructs the movable unit of the stopper mechanism 11 (second piston 13) together with the stopper 14, the piston ring 17, and the cushioning member 18.

The stopper fixing hole 15A is a bottomed hole extending in the axial direction from an end surface (end surface opposed to the stopper 14) of the castle 15, and an annular groove 15A1 expanded radially outward is formed on the bottom portion side of the stopper fixing hole 15A. The engaging portion 14A2 of the stopper 14 is fitted in the annular groove 15A1 of the stopper fixing hole 15A by metal flow. Consequently, the stopper 14 is fixed to the castle 15 so as to be retained and stopped in rotation, thereby integrally coupling the castle 15 and the stopper 14 to each other.

The recessed portions 15B are positioned in a lower end surface (end surface to which the stopper 14 is coupled) of the castle 15 which is the cylindrical body, and the plurality of (for example, five) recessed portions 15B are arranged at equal intervals in a circumferential direction of the castle 15. Those recessed portions 15B are formed by cutting out the lower end surface of the castle 15 in the radial direction, and serve as flow paths for allowing the working oil to flow between the lower end surface of the castle 15 and an upper end surface of the piston ring 17. Through the formation of the recessed portions 15B, in other words, cutouts as described above, the working oil can constantly flow between the castle 15 and the piston ring 17.

A ring groove 16 is positioned between the stopper 14 and the castle 15, and is formed on an outer peripheral surface of the cylindrical portion 14A of the stopper 14 (outer periphery of the second piston 13). The ring groove 16 is formed by the stopper 14 and the castle 15 into a circumferential groove having a U-shape in cross section by integrally coupling the castle 15 and the stopper 14 to each other by metal flow. Specifically, the lower end surface of the castle 15 serves as an upper end surface of the ring groove 16, and the upper end surface of the flange portion 14B of the stopper 14 serves as a lower end surface of the ring groove 16. In this case, the recessed portions 15B1 of the castle 15 cause, as cutouts formed in the ring groove 16, the working oil to constantly flow between the castle 15 and the piston ring 17. The piston ring 17 is loosely fitted in the ring groove 16, and is fixed into the ring groove 16 so as to be retained and be displaceable in the axial direction in a predetermined range.

The piston ring 17 is loosely fitted in the ring groove 16 so as to be retained between the stopper 14 and the castle 15. Specifically, the piston ring 17 is restricted in movement in the axial direction by the stopper 14 and the castle 15, and can be displaced slightly in the axial direction between the upper end surface of the flange portion 14B and the lower end surface of the castle 15. The piston ring 17 is made of a resin material having sufficient heat resistance to heat for coupling the stopper 14 to the castle 15 by metal flow.

The piston ring 17 is made of an elastic material having high heat resistance (for example, a fluororesin), and is formed into an annular shape as a C-shaped ring that is cut, for example, at a halfway portion (one portion) in the circumferential direction at a position of a cut portion 17A so as to be radially shrinkable and expandable. Specifically, the piston ring 17 includes the cut portion 17A corresponding to both ends in the circumferential direction which are formed by partially cutting the piston ring 17. Therefore, when the piston ring 17 enters the sleeve 12B, an outer peripheral surface of the piston ring 17 is held in sliding contact with an inner peripheral surface of the sleeve 12B. As a result, the outer peripheral surface of the piston ring 17 seals a gap between the sleeve 12B and the second piston 13, thereby being capable of restricting the flow of the working oil.

The piston ring 17 is removably fixed into the ring groove 16 formed between the upper end surface of the flange portion 14B of the stopper 14 and the lower end surface of the castle 15. The piston ring 17 in a free length state (free state in which an external force is not applied) is formed to have such a dimension that an outer diameter dimension thereof is smaller than an inner diameter of the inner cylinder 5 and is slightly larger than an inner diameter of the sleeve 12B. Further, in order to prevent damage, scuffing, and the like caused when the piston ring 17 enters the sleeve 12B, a corner side of an upper end surface of the piston ring 17, which is positioned on one side in the axial direction, is subjected to chamfering processing so that a corner portion has an arc shape.

The cushioning member 18 is a buffer member for preventing collision. The cushioning member 18 is provided by being inserted on the outer peripheral side of the piston rod 7, and is configured to mitigate collision and impact by the second piston 13 against the rod guide 9. The cushioning member 18 is made of an elastically deformable synthetic resin, a rubber material, or a hard rubber material (for example, an elastic material softer than the piston ring 17), and is formed as a cylindrical body. Thus, at maximum extension of the piston rod 7, even when the second piston 13 collides against (is brought into abutment against) the rod guide 9, impact of the collision is mitigated, and further extension of the piston rod 7 is restricted. The cushioning member 18 includes an uneven surface 18A and recessed grooves 18B. The cushioning member 18 constructs the movable unit of the stopper mechanism 11 (second piston 13) together with the stopper 14, the castle 15, and the piston ring 17.

Figure 5:
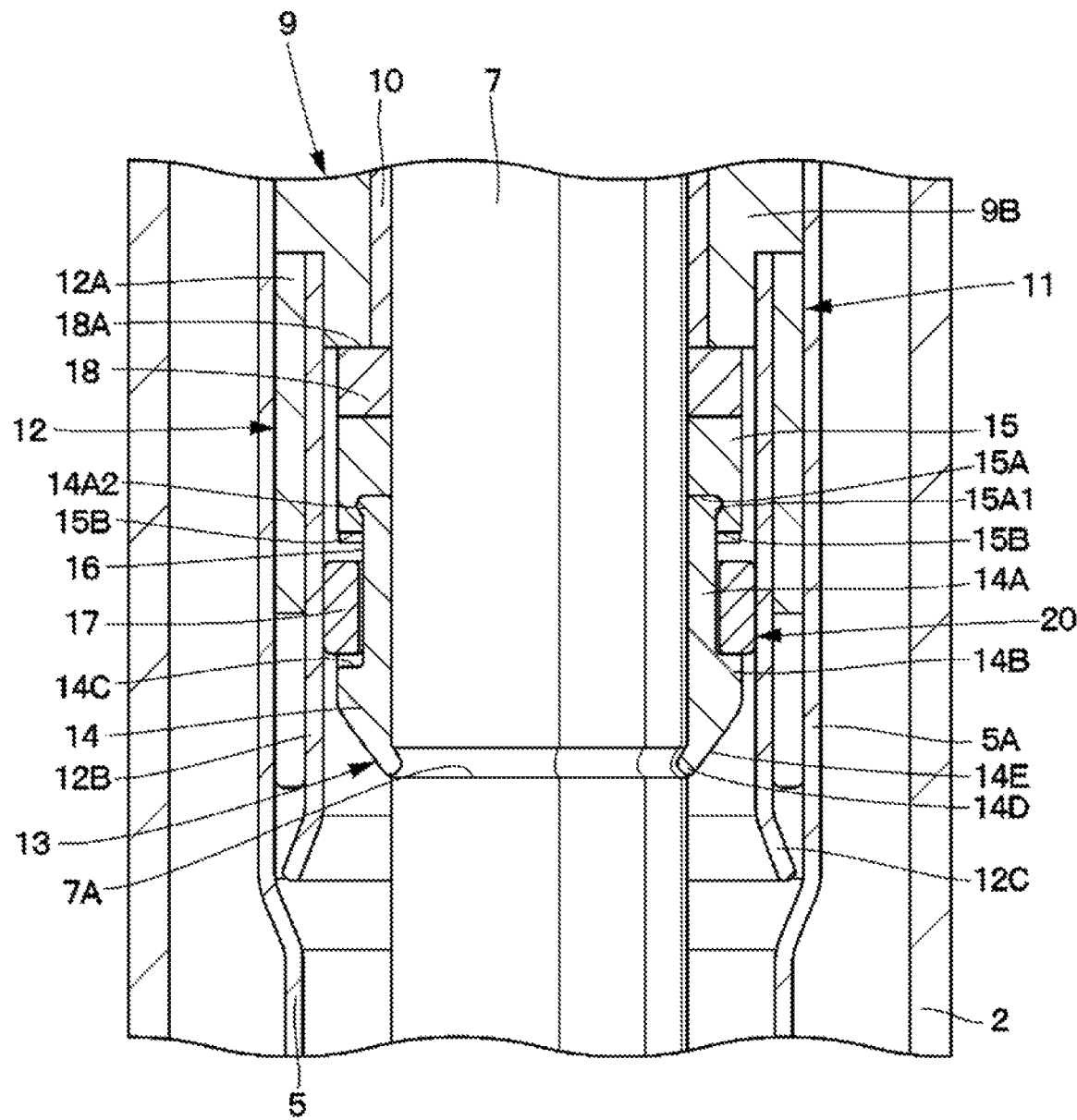
FIG. 5 is an enlarged sectional view for illustrating a stopper mechanism at full extension of a piston rod.

As illustrated in FIG. 2, the uneven surface 18A is positioned on an upper surface of the cushioning member 18, and is formed into a corrugated shape. Therefore, at maximum extension of the piston rod 7, even when the second piston 13 enters the second cylinder 12, and the uneven surface 18A of the cushioning member 18 is brought into abutment against a lower surface of the rod guide 9 (small diameter portion 9B), with the corrugated uneven surface 18A, occurrence of a phenomenon of close contact therebetween or the like can be prevented (see FIG. 5).

The recessed grooves 18B are positioned on an outer peripheral side of the cushioning member 18 which is the cylindrical body, and the plurality of (for example, six) recessed grooves 18B are arranged at equal intervals in a circumferential direction of the cushioning member 18. The recessed grooves 18B are formed by cutting out an outer peripheral surface of the cushioning member 18 along the axial direction, and serve as flow paths for allowing the working oil to flow between the sleeve 12B of the second cylinder 12 and the cushioning member 18.

The structure of the hydraulic shock absorber 1 as the cylinder device according to the embodiment is described above. Next, description is made of an assembling method for the cylinder device.

First, when the second piston 13 constructing the movable unit of the hydraulic stopper mechanism 11 is assembled to the piston rod 7, an assembling step (sub-assembling step) and a fixing step for the second piston 13 are performed prior to the mounting of the piston 6 to the piston rod 7.

Figure 3:
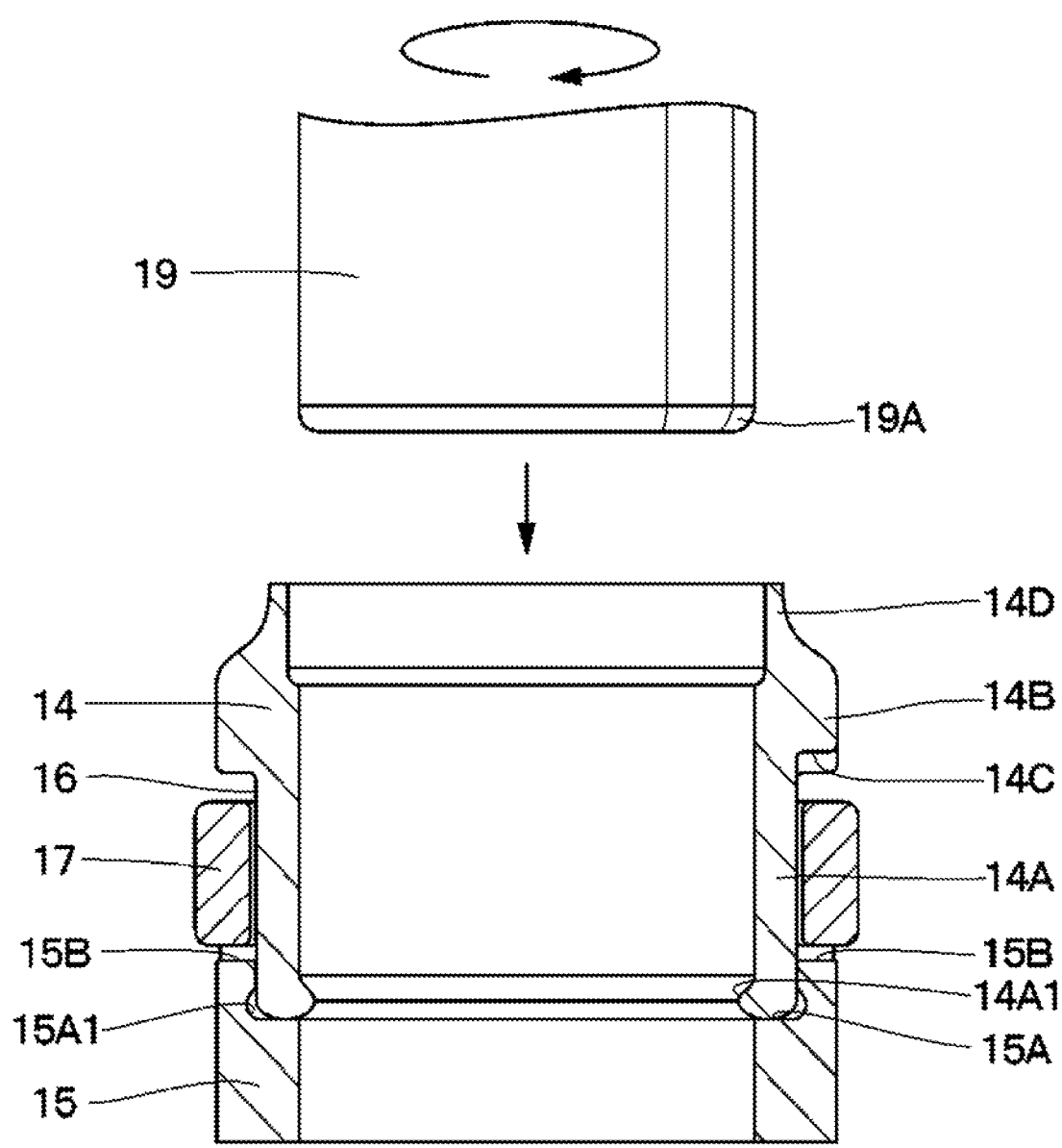
FIG. 3 is a sectional view for illustrating a step of integrally coupling a stopper and a castle to each other by metal flow.

As the assembling step for the second piston 13, as illustrated in FIG. 3, the piston ring 17 is mounted from the engaging-portion forming surface 14A1 side into the cylindrical portion 14A of the stopper 14 so as to be loosely fitted thereto. In this case, an inner diameter dimension of the piston ring 17 in a free length state is slightly larger than the outer peripheral surface (outer diameter dimension) of the cylindrical portion 14A of the stopper 14. Therefore, in a state in which the castle 15 is attached, the piston ring 17 can be displaced slightly in the axial direction between an end surface of the flange portion 14B and the end surface (surface in which the recessed portions 15B are formed) of the castle 15.

After the piston ring 17 is attached, the castle 15 is assembled to the stopper 14 so that the engaging-portion forming surface 14A1 of the stopper 14 is held in abutment against the bottom surface of the stopper fixing hole 15A of the castle 15. Then, as illustrated in FIG. 3, in a state in which a cemented carbide tool 19 is inserted in an inner peripheral side of the stopper 14 so as to be held in abutment against the engaging-portion forming surface 14A1 of the stopper 14, the cemented carbide tool 19 is rotated at high speed by a drive motor (not shown). In this case, the arc-shaped chamfered surface 19A of the cemented carbide tool 19 is held in abutment against the engaging-portion forming surface 14A1 of the stopper 14. Consequently, a temperature of the engaging-portion forming surface 14A1 is raised to a high temperature (for example, about 1,000° C.) by friction heat for several seconds so that local deformation (softening and plastic flow) occurs, thereby forming the engaging portion 14A2 to be fitted in the annular groove 15A1 of the stopper fixing hole 15A of the castle 15. As a result, as illustrated in FIG. 4, the castle 15 is integrally coupled to the stopper 14 so as be retained by metal flow.

Figure 4:
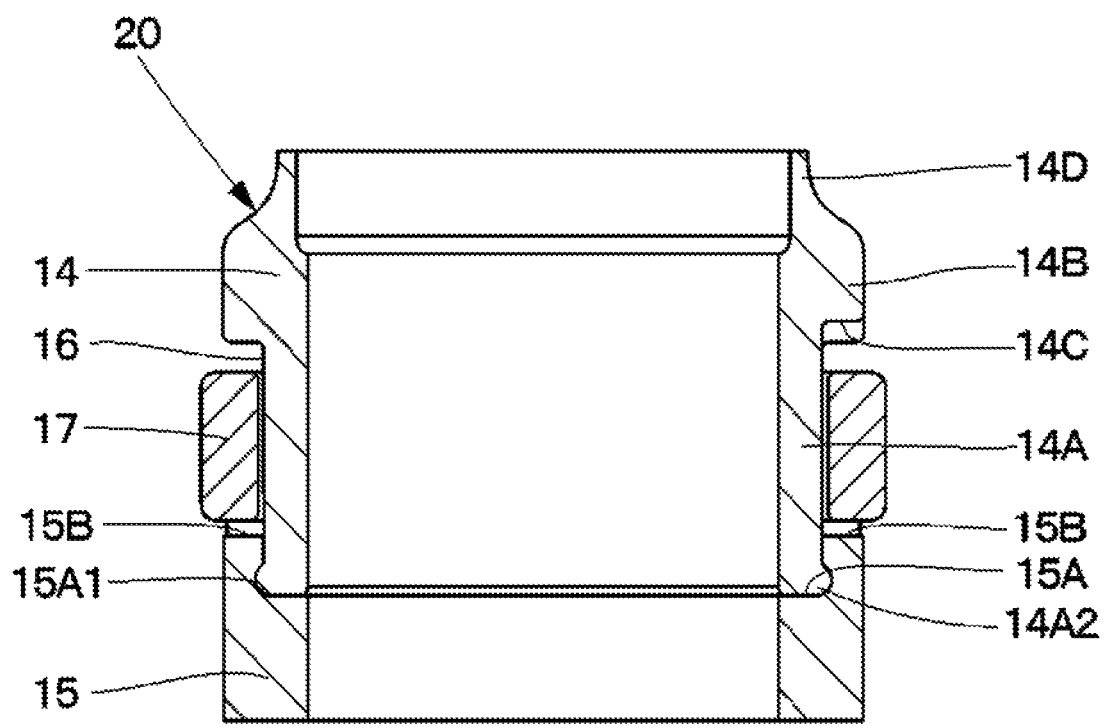
FIG. 4 is a sectional view for illustrating a state in which the stopper and the castle are integrally coupled to each other by metal flow.

Next, as the fixing step for the second piston 13, a subassembly 20, which is sub-assembled in advance and includes the stopper 14, the castle 15, and the piston ring 17 that are assembled as illustrated in FIG. 4 is reversed to an opposite side. In this state, the subassembly 20 is inserted from the first piston 6 side which is the lower end side, along an outer peripheral surface of the piston rod 7. Then, the fitting portion 14D of the stopper 14 is fitted in the annular groove 7A by fixing means such as metal flow. In this manner, only the stopper 14 of the second piston 13 is fixed to the piston rod 7. At this time, the subassembly 20 including the stopper 14, the castle 15, and the piston ring 17 is fixed to the outer peripheral side of the piston rod 7. After that, the cushioning member 18 is inserted on the outer peripheral side of the piston rod 7 from above the castle 15 so as to be loosely fitted to the piston rod 7. In this manner, a lower end surface of the cushioning member 18 is held in abutment against an upper end surface of the castle 15.

Meanwhile, the second cylinder 12 of the stopper mechanism 11 is assembled by fitting the sleeve 12B in the large diameter portion 5A of the inner cylinder 5 through intermediation of the cylindrical collar 12A. In this state, the piston rod 7 is inserted through the inside of the inner cylinder 5, and at this time, the first piston 6 is slidably fit-inserted in the inner cylinder 5.

After that, the large diameter portion 9A and the small diameter portion 9B of the rod guide 9 are press-fitted to the outer cylinder 2 and the inner cylinder 5, respectively. Then, the lid member 3 having the rod seal 4 and other components mounted thereon is arranged on an upper side with respect to the rod guide 9. Next, in order to prevent backlash of the rod guide 9 in the axial direction, the rod guide 9 is pressed against the inner cylinder 5 through intermediation of the lid member 3, for example, with a cylindrical presser (not shown). In this state, an upper end portion of the outer cylinder 2 is bent to the radially inner side so that a radially outer side of the lid member 3 and the large diameter portion 9A of the rod guide 9 are fixed with the swaged portion 2A.

After that, in the hydraulic shock absorber 1 assembled in this way, the upper end side of the piston rod 7 is mounted to a vehicle body side of an automobile (not shown), and a lower end side of the outer cylinder 2 is mounted to an axle side (not shown). With this, in a case in which vibration is generated during traveling of the automobile, in conjunction with retraction and extension in the axial direction of the piston rod 7 with respect to the inner cylinder 5 and the outer cylinder 2, damping forces are generated on the retraction side and the extension side by the disc valves 6C and 6D of the first piston 6 and the like. As a result, upward and downward vibration of the vehicle can be damped and buffered.

Specifically, during an extension stroke of the piston rod 7, pressure in the rod side oil chamber C becomes higher. Thus, pressure oil in the rod side oil chamber C flows into the bottom side oil chamber B through the disc valve 6D, and the damping force on the extension side is generated. Then, the working oil with a volume corresponding to an amount of exit of the piston rod 7 from the inner cylinder 5 flows from the reservoir chamber A into the bottom side oil chamber B through intermediation of a bottom valve (not shown).

At this time, the pressure in the rod side oil chamber C becomes higher, and hence the working oil in the rod side oil chamber C may leak out into the oil pool chamber 9C, for example, through the small gaps between the piston rod 7 and the guide portion 10. Further, when the leakage oil in the oil pool chamber 9C increases in amount and overflows therefrom, the leakage working oil is guided to the communication path 9D side of the rod guide 9 through the check valve (not shown) provided between the lid member 3 and the rod guide 9, and gradually refluxed into the reservoir chamber A. In this case, a gap is secured between the outer peripheral surface of the piston ring 17 and the inner peripheral surface of the inner cylinder 5. Thus, the working oil flows from one side to the other side of the stopper mechanism 11 through the gap.

Meanwhile, during a retraction stroke of the piston rod 7, pressure in the bottom side oil chamber B positioned on a lower side with respect to the first piston 6 becomes higher. Thus, pressure oil in the bottom side oil chamber B flows into the rod side oil chamber C through the disc valve 6C of the first piston 6, and the damping force on the retraction side is generated. Then, the working oil with a volume corresponding to an amount of entry of the piston rod 7 into the inner cylinder 5 flows from the bottom side oil chamber B into the reservoir chamber A through intermediation of the bottom valve. In this way, gas in the reservoir chamber A is compressed to absorb the volume corresponding to the amount of entry of the piston rod 7. Also in this case, similarly to the state at the above-mentioned extension, a sufficient gap is secured between the outer peripheral surface of the piston ring 17 and the inner peripheral surface of the inner cylinder 5. Thus, the working oil flows from the one side to the other side of the stopper mechanism 11 through the gap.

Figure 6:
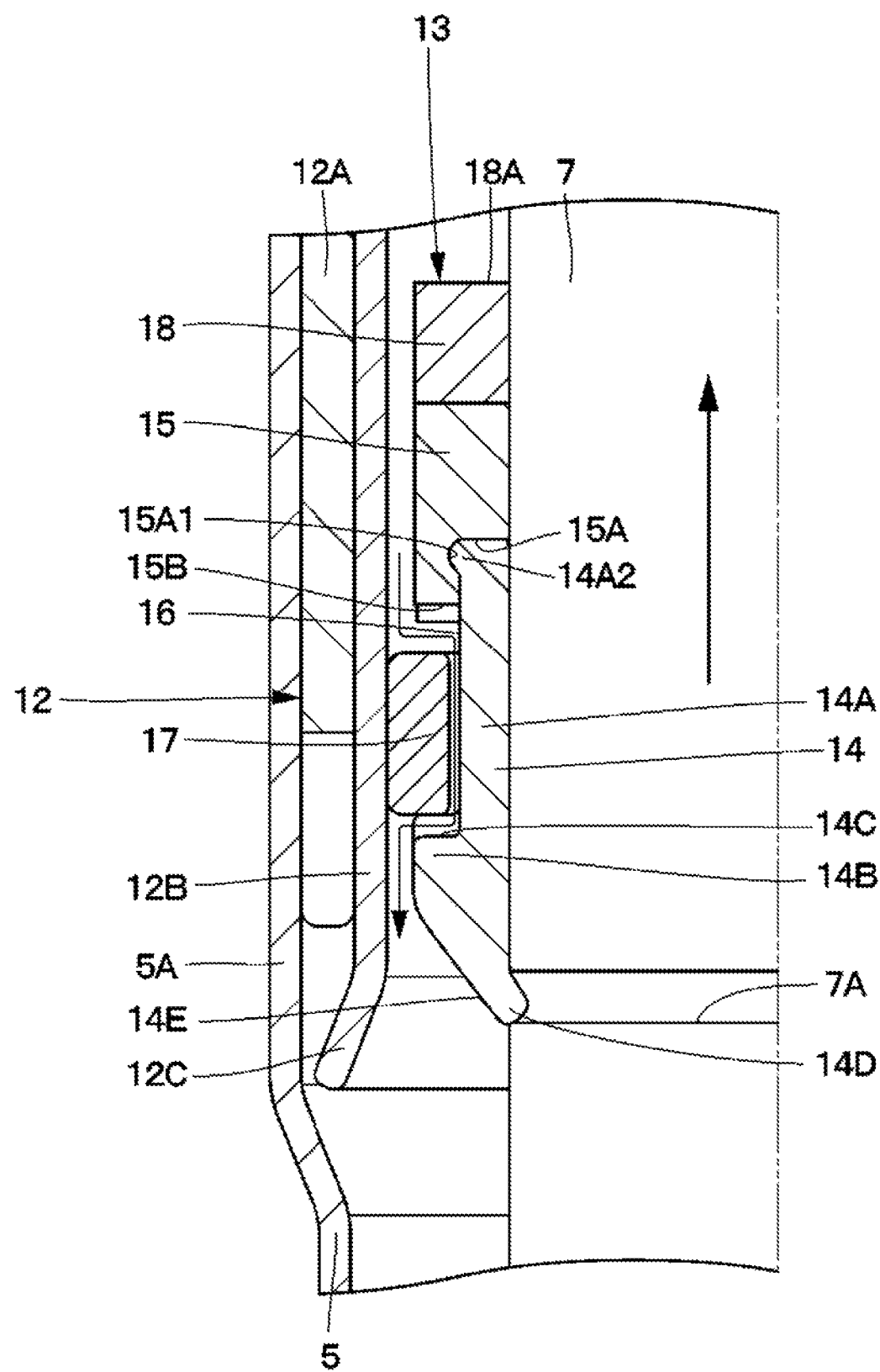
FIG. 6 is an enlarged sectional view for illustrating the stopper mechanism during an extension stroke of the piston rod.

Incidentally, when the piston rod 7 largely extends to the outside of the outer cylinder 2, the second piston 13 which is the movable unit of the stopper mechanism 11 is slidably fit-inserted (enters) in the inner peripheral side of the second cylinder 12. At this time, the outer peripheral surface of the piston ring 17 is held in sliding contact with the inner peripheral surface of the sleeve 12B, and the piston ring 17 is relatively displaced in the axial direction between the flange portion 14B of the stopper 14 and the castle 15. Specifically, as illustrated in FIG. 6, the lower end surface of the piston ring 17 is brought into abutment against the upper surface of the flange portion 14B of the stopper 14.

In this case, an inner diameter dimension of the piston ring 17 in the free length state is slightly larger than of the outer peripheral surface of the cylindrical portion 14A of the stopper 14. Thus, a gap is formed between the piston ring 17 and the outer peripheral surface of the cylindrical portion 14A of the stopper 14. Consequently, a small path (oil path) for allowing the flow of the working oil is formed by the gap and the cutout 14C formed in the flange portion 14B. The path causes the working oil in the second cylinder 12 to be discharged from one side of the second piston 13 in the axial direction (upper side) to the other side (lower side) thereof in the axial direction.

With this, large restriction resistance is applied to the working oil, which flows in the second cylinder 12 in the discharging direction from the one side of the second piston 13 in the axial direction (upper side) to the other side (lower side) thereof in the axial direction, when the working oil flows through the cutout 14C.

Therefore, in a state in which the piston rod 7 largely extends, and the second piston 13 enters the second cylinder 12 so as to be fit-inserted thereinto together with the piston ring 17 (full extension state of the piston rod 7), with the above-mentioned restriction resistance applied to the working oil, a force to act in a direction of suppressing extension movement of the piston rod 7 can be generated. The force forms an impact mitigating force at maximum extension of the piston rod 7. As a result, a hydraulic cushioning effect can be given to displacement of the piston rod 7 in the extending direction, thereby being capable of suppressing the full extension of the piston rod 7.

Further, even in a case in which the piston rod 7 is subjected to the maximum extension up to a position at which the cushioning member 18 collides against the lower surface of the rod guide 9 in the second cylinder 12, the cushioning member 18 for preventing collision can mitigate impact by being elastically deformed at this time. Further extension movement of the piston rod 7 can be prevented (see FIG. 5).

Figure 7:
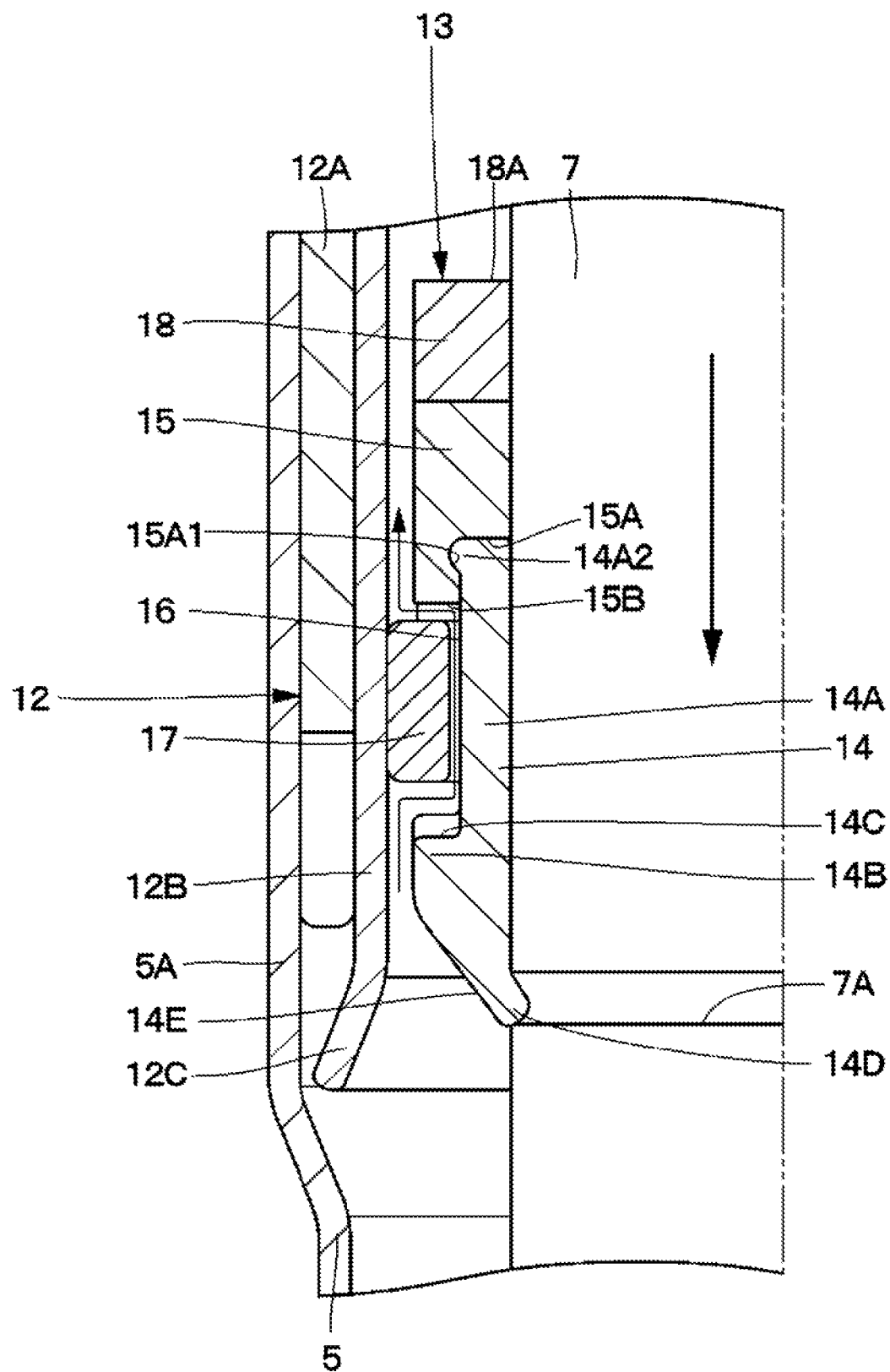
FIG. 7 is an enlarged sectional view of the stopper mechanism during a retraction stroke of the piston rod.

Meanwhile, when the piston rod 7 at the maximum extension as described above is switched to the retraction stroke, that is, when the second piston 13 is displaced in a direction of moving downward from the second cylinder 12, the piston ring 17 is held in sliding contact with the sleeve 12B of the second cylinder 12, and the piston ring 17 moves with relative upward displacement. Specifically, as illustrated in FIG. 7, the upper end surface of the piston ring 17 is held in abutment against the lower end surface of the castle 15.

However, in this case, the plurality of recessed portions 15B are formed in the castle 15, and hence cutouts (gaps) for allowing the working oil to flow therethrough are formed between the upper end surface of the piston ring 17 and the recessed portions 15B. Therefore, in the retraction stroke of the piston rod 7, the plurality of recessed portions 15B of the castle 15 can allow the working oil to smoothly flow toward the second cylinder 12 from the other side of the second piston 13 in the axial direction to the one side thereof in the axial direction, thereby being capable of facilitating retraction movement of the piston rod 7.

In particular, the gaps formed by the plurality of recessed portions 15B are formed to have a flow path area larger than a flow path area of the cutout 14C of the flange portion 14B. Therefore, the flow path area for the working oil becomes larger at the time of retraction of the piston rod 7 than at the extension of the piston rod 7. As a result, the second piston 13 moves so as to smoothly exit downward from an inside of the second cylinder 12, thereby being capable of compensating smooth retraction movement of the piston rod 7.

In this way, according to the embodiment, the hydraulic stopper mechanism 11 includes the second cylinder 12 fixed to the inside of the large diameter portion 5A of the inner cylinder 5 and the second piston 13 provided on the outer peripheral side of the piston rod 7. The second piston 13 includes the stopper 14 coupled to the piston rod 7, the castle 15 positioned on the upper side with respect to the stopper 14, the piston ring 17 fixed into the ring groove 16 formed by the stopper 14 and the castle 15, and the cushioning member 18.

Specifically, the stopper 14 and the castle 15 are integrated with each other, and the ring groove 16 is formed between the stopper 14 and the castle 15. In this case, the piston ring 17 is fit-inserted into the stopper 14 so that the stopper 14 and the castle 15 are coupled to each other, thereby fixing the piston ring 17 into the ring groove 16. In this manner, the piston ring 17 can be fixed into the ring groove 16 so as to be displaceable therein in the axial direction and retained. Further, the stopper 14, the castle 15, and the piston ring 17 construct the subassembly 20. As a result, the stopper mechanism 11 can be constructed with a small number of components, thereby being capable of enhancing efficiency in assembly and productivity of the stopper mechanism 11.

Further, the engaging portion 14A2 as the plastically deformed portion is formed by subjecting the engaging-portion forming surface 14A1 of the stopper 14 to metal flow, and the stopper 14 and the castle 15 are integrated with each other with the engaging portion 14A2. With this configuration, the stopper 14 and the castle 15 can firmly be coupled to each other by retaining.

Further, in the stopper 14, there is formed the cutout 14C as a restriction portion for suppressing the flow of the working oil to generate the damping force. With this configuration, when the piston rod 7 approaches the maximum extension position, the piston ring 17 is held in abutment against the flange portion 14B of the stopper 14, thereby being capable of securing a flow path for allowing the working oil to flow only through the cutout 14C. As a result, the flow of the working oil can be suppressed to generate the damping force, thereby being capable of generating an impact mitigating force at maximum extension of the piston rod 7.

Further, the recessed portions 15B of the castle 15 cause, as the cutouts formed in the ring groove 16, the working oil to constantly flow between the castle 15 and the piston ring 17. With this configuration, at the retraction stroke of the piston rod 7, the working oil can be allowed to smoothly flow toward the second cylinder 12 from the other side of the second piston 13 in the axial direction to the one side thereof in the axial direction, thereby being capable of facilitating retraction movement of the piston rod 7.

Figure 8:
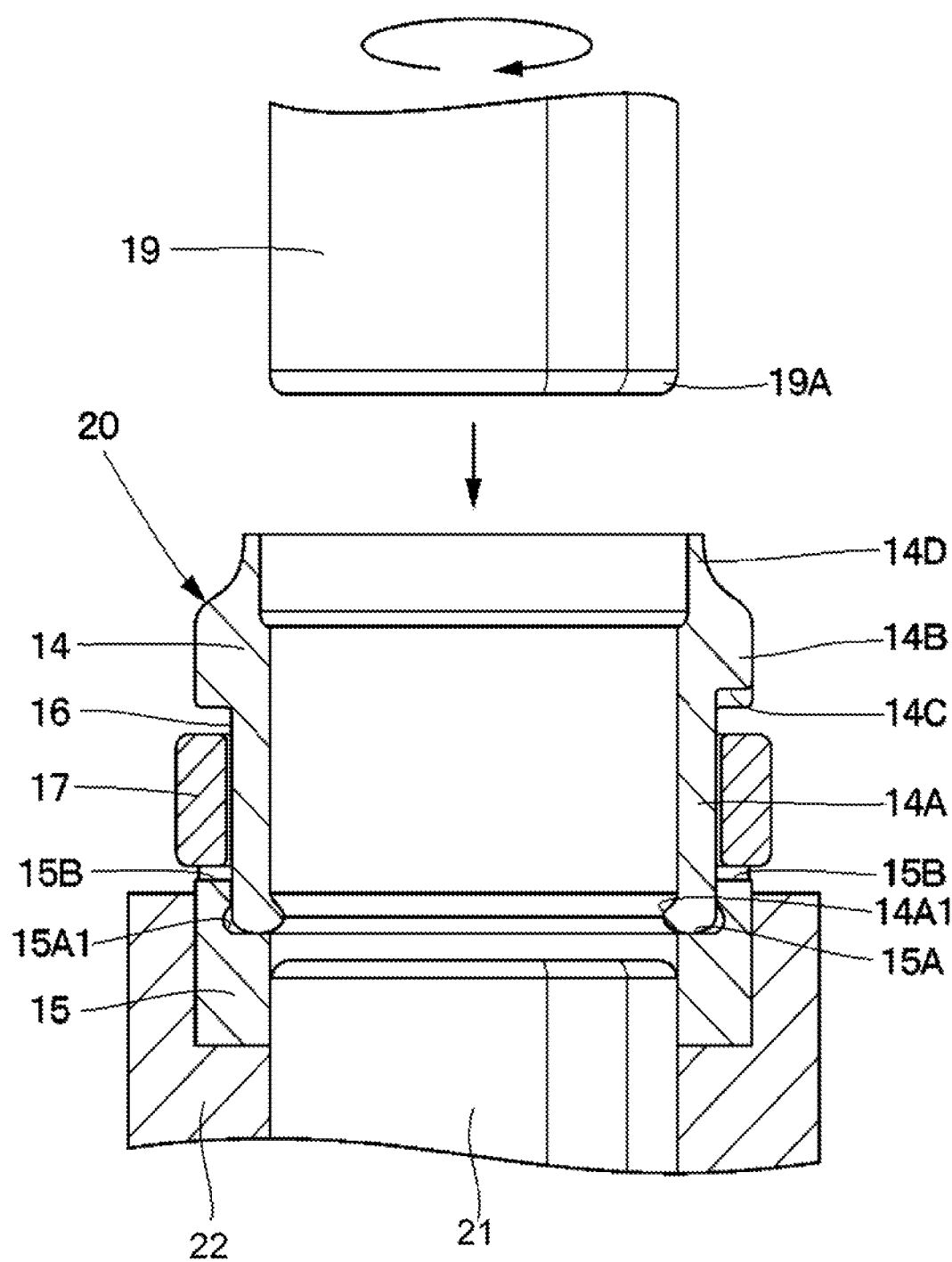
FIG. 8 is a sectional view for illustrating a state in which the stopper and the castle are integrally coupled to each other by metal flow in a first modification.

In the above-mentioned embodiment, the engaging portion 14A2 is formed by subjecting the engaging-portion forming surface 14A1 of the stopper 14 to metal flow with use of the cemented carbide tool 19. In this case, for example, as in a first modification illustrated in FIG. 8, metal flow may be performed with use of an inner jig 21 and an outer jig 22. Specifically, the stopper 14, the castle 15, and the piston ring 17 that construct the subassembly 20 are positioned in the radial direction and the axial direction with use of the inner jig 21 and the outer jig 22 as guide members. In this case, the inner jig 21 is fit-inserted in an inner peripheral side of the castle 15, and the outer jig 22 having one stepped end formed thereon is fit-inserted on an outer peripheral side of the castle 15, thereby being capable of performing assembly work for the subassembly 20 efficiently.

Figure 9:
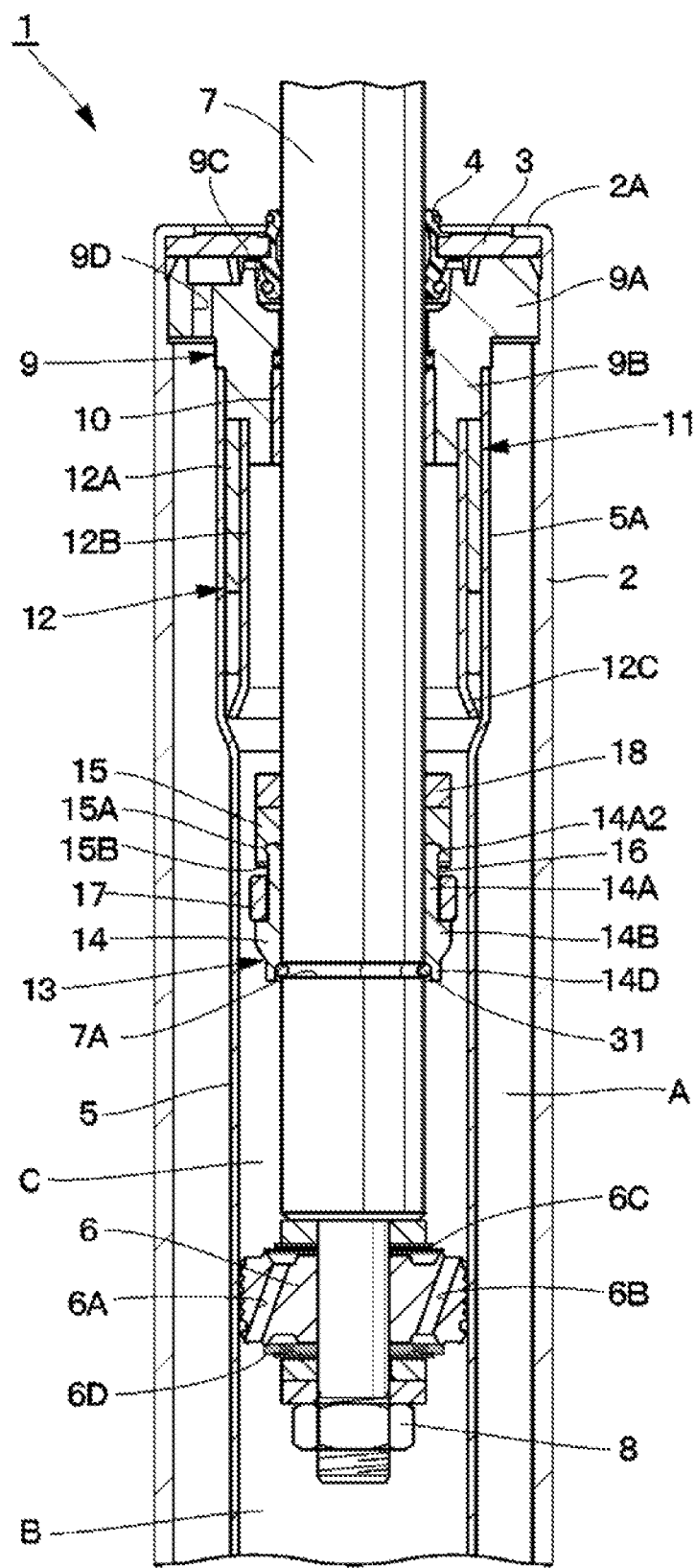
FIG. 9 is a sectional view of a shock absorber in a second modification.

Further, in the above-mentioned embodiment, the fitting portion 14D of the stopper 14 is fitted in the annular groove 7A with use of a fixing means such as metal flow, thereby fixing the second piston 13 to the piston rod 7. However, the present invention is not limited thereto, and may employ a manner as in a second modification illustrated in FIG. 9. Specifically, a ring member 31 as a snap ring may be fitted in the annular groove 7A of the piston rod 7, and the stopper 14 may be placed on the ring member 31. With this configuration, the second piston 13 can be fixed to the piston rod 7.

Further, in the above-mentioned embodiment, the stopper 14 and the castle 15 are integrated with each other by metal flow. However, the present invention is not limited thereto, and the stopper and the castle may be integrated with each other by means such as a screw, adhesion, or welding.

Further, in the above-mentioned embodiment, the five recessed portions 15B are formed in the castle 15. However, the present invention is not limited thereto, and one to four or six or more recessed portions may be formed in the castle.

Further, in the above-mentioned embodiment, the corrugated uneven surface 18A is formed on the upper surface of the cushioning member 18. However, the present invention is not limited thereto, and there may be formed a through hole passing through the cushioning member in the axial direction from the upper end surface to the lower end surface.

Further, in the above-mentioned embodiment, description is made by taking, as an example, the case in which the piston ring 17 is formed as the radially shrinkable and expandable ring made of, for example, a fluorine synthetic resin having heat resistance. However, the present invention is not limited thereto. The piston ring may be made of, for example, a fiber reinforced resin material having high strength, or the piston ring may be made of a metal material.

Further, in the above-mentioned embodiment, a cylinder to serve as the second cylinder 12 is fit-inserted into the inner cylinder 5 (first cylinder), and the inner cylinder 5 and the second cylinder 12 are formed as separate members. However, the present invention is not limited thereto, and, for example, the inner cylinder may be radially shrunk to integrally form the inner cylinder and the second cylinder.

Further, in the above-mentioned embodiment, description is made by taking a shock absorber of a double-tube type, which includes the outer cylinder 2 and the inner cylinder 5, as an example. However, the present invention is not limited thereto, and is applicable to a shock absorber of a single-tube type in which a piston is slidably fit-inserted into a single cylinder.

Further, in the above-mentioned embodiment, description is made by taking the hydraulic shock absorber 1 to be mounted to each axle side of a four-wheeled automobile as a typical example of a cylinder device, but the present invention is not limited thereto. For example, the cylinder device may include a hydraulic shock absorber for a two-wheeled vehicle, or may include a cylinder device to be used not only for an automobile but also for other various machines, constructions, and the like.

As the shock absorber based on the above-mentioned embodiment, for example, modes described below are conceivable.

As a first mode, there is provided a cylinder device including: a first cylinder in which working fluid is sealed; a first piston which is slidably fit-inserted in the first cylinder, and divides an inside of the first cylinder, a piston rod coupled to the first piston; a rod guide provided on one end side of the first cylinder, and configured to guide the piston rod in a slidable manner by allowing the piston rod to be inserted through the rod guide; and a stopper mechanism configured to operate when the piston rod extends or retracts to reach an end portion in the first cylinder. The stopper mechanism includes: a second cylinder provided at an end portion in the first cylinder; and a second piston configured to move along with movement of the piston rod to be fit-inserted through the second cylinder. The second piston includes: a first member coupled to the piston rod; a second member integrated with the first member and forming a ring groove on an outer periphery of the second piston between the first member and the second member; and a piston ring which is fixed into the ring groove formed by the first member and the second member so that the piston ring is displaceable in the ring groove in an axial direction and is retained in the ring groove, and has an annular shape with both ends in a circumferential direction which are formed by partially cutting the piston ring. A subassembly including the first member, the second member, and the piston ring is fixed to the piston rod. With this configuration, the work efficiency at the time of assembling components of the stopper mechanism to the piston rod can be enhanced.

As a second mode, in the first mode, the first member and the second member are integrated with each other with a plastically deformed portion. With this configuration, the first member and the second member can firmly be coupled to each other by retaining.

As a third mode, in the first mode or the second mode, the ring groove has a cutout for allowing the working fluid to constantly flow between the second member and the piston ring. With this configuration, the working fluid can smoothly flow between the second member and the piston ring.

As a fourth mode, in any one of the first mode to the third mode, the piston rod has a groove, and the first member is coupled to the groove by plastic flow. With this configuration, the piston rod and the first member can firmly be fixed to each other.

As a fifth mode in any one of the first mode to the third mode, the piston rod has a groove, and the first member is placed on a ring member provided on the groove. With this configuration, the piston rod and the first member can firmly be fixed to each other.

REFERENCE SIGNS LIST 1 hydraulic shock absorber (cylinder device)
5 inner cylinder (first cylinder)
6 first piston
7 piston rod
9 rod guide
11 stopper mechanism
12 second cylinder
13 second piston
14 stopper (first member)
15 castle
15B recessed portion (cutout)
16 ring groove
17 piston ring
17A cut portion (at both ends)
20 subassembly
31 ring member

The invention claimed is:

1. A cylinder device, comprising:
a first cylinder in which working fluid is sealed;
a first piston which is slidably fit-inserted in the first cylinder, and divides an inside of the first cylinder;
a piston rod coupled to the first piston;
a rod guide provided on one end side of the first cylinder, and configured to guide the piston rod in a slidable manner by allowing the piston rod to be inserted through the rod guide; and
a stopper mechanism configured to operate when the piston rod extends or retracts to reach an end portion in the first cylinder,
wherein the stopper mechanism includes:
a second cylinder provided at an end portion in the first cylinder; and
a second piston configured to move along with movement of the piston rod and provided to be fit-inserted through the second cylinder,
wherein the second piston includes:
a first member coupled to the piston rod and including a first portion and a second portion contiguous to the first portion, the first portion having a larger width in a radial direction of the second cylinder than the second portion so that a stepped portion is formed at a boundary of the first portion and the second portion;
a second member integrated with the second portion and forming a ring groove on an outer periphery of the second piston between the stepped portion and the second member; and
a piston ring which is fixed in the ring groove formed by the first member and the second member so that the piston ring is displaceable in the ring groove in an axial direction between the stepped portion and the second member and is retained in the ring groove between the stepped portion and the second member regardless of an axial position of the piston rod, and the piston ring has an annular shape with both ends in a circumferential direction which are formed by partially cutting the piston ring, and
wherein the first member and the second member are integrally coupled with each other by at least a portion of the first member and a portion of the second member being plastically deformed.

2. The cylinder device according to claim 1, wherein the ring groove has a cutout for allowing the working fluid to constantly flow between the second member and the piston ring.

3. The cylinder device according to claim 1, wherein the piston rod has a groove, and the first member is coupled to the groove by plastic flow.

4. The cylinder device according to claim 1, wherein the piston rod has a groove, and the first member is placed on a ring member provided on the groove.

5. The cylinder device according to claim 2, wherein the piston rod has a groove, and the first member is coupled to the groove by plastic flow.

6. The cylinder device according to claim 1, wherein:
one of the first member and the second member includes a fixing hole for fixing the other member to the one member;
an annular groove is formed on the inside of the fixing hole; and
the other member includes an engaging portion fitted in the annular groove.

* * * * *